(12) United States Patent
Ponte et al.

(10) Patent No.: US 7,548,616 B1
(45) Date of Patent: Jun. 16, 2009

(54) TERMINATION DEVICE FOR A TELEPHONE LINE

(75) Inventors: Eliyahu Ponte, Netanya (IL); Yossef Reuven, Even-Yehuda (IL)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/258,581

(22) PCT Filed: May 22, 2000

(86) PCT No.: PCT/EP00/04649

§ 371 (c)(1),
(2), (4) Date: Feb. 27, 2003

(87) PCT Pub. No.: WO01/91439

PCT Pub. Date: Nov. 29, 2001

(51) Int. Cl.
*H04M 9/08* (2006.01)

(52) U.S. Cl. .................. 379/399.01; 330/126; 370/235; 370/480; 370/524; 375/296; 379/378; 379/398; 379/413.02; 380/270

(58) Field of Classification Search ............ 379/390.03, 379/399.01, 219, 372, 398, 413.02, 378, 379/388.01; 84/700; 370/480, 235, 524; 330/126; 375/222, 322, 296; 380/270
See application file for complete search history.

(56) References Cited

U.S. PATENT DOCUMENTS

| | | | | |
|---|---|---|---|---|
| 4,018,126 | A * | 4/1977 | Walmann ...................... | 84/700 |
| 4,442,540 | A | 4/1984 | Allen | |
| 4,726,064 | A * | 2/1988 | Kishi et al. .................. | 380/270 |
| 5,377,230 | A * | 12/1994 | Golden ........................ | 375/296 |
| 5,627,501 | A * | 5/1997 | Biran et al. ............ | 379/390.03 |
| 5,987,069 | A | 11/1999 | Furukawa et al. | |
| 6,035,029 | A * | 3/2000 | Little et al. .................. | 379/219 |
| 6,072,363 | A * | 6/2000 | Steigenberger et al. ..... | 330/126 |
| 6,275,542 | B1 * | 8/2001 | Katayama et al. ........... | 375/322 |
| 6,359,906 | B1 * | 3/2002 | Dyke et al. .................. | 370/480 |
| 6,477,249 | B1 * | 11/2002 | Williamson et al. .... | 379/399.01 |
| 6,567,519 | B1 * | 5/2003 | Ham .......................... | 379/372 |
| 6,731,750 | B1 * | 5/2004 | Bareis .................... | 379/399.01 |
| 6,751,315 | B1 * | 6/2004 | Liu et al. ................ | 379/413.02 |

(Continued)

FOREIGN PATENT DOCUMENTS

JP    2001-508254    6/2001

(Continued)

OTHER PUBLICATIONS

Cook et al., "ADSL and VADSL Splitter Design and Telephony Performance", IEEE Journal on Selected Areas in Communications, vol. 13, No. 9, published Dec. 1, 1995, XP000543160, ISSN: 0733-8716.

(Continued)

*Primary Examiner*—Gerald Gauthier
(74) *Attorney, Agent, or Firm*—Jenkins, Wilson, Taylor & Hunt, P.A.

(57) ABSTRACT

A termination device for a telephone line of a wire based telephone system, said termination device (30) comprising: a high pass filter (39) for separating signals within a frequency band used by a high-speed modem (13) for data transmission; and impedance means (53) connected to the high-pass filter (39), wherein said impedance means (53) has an impedance which matches the impedance of the telephone line in the frequency band used by the high-speed modem (13).

34 Claims, 5 Drawing Sheets

U.S. PATENT DOCUMENTS

| | | | | |
|---|---|---|---|---|
| 6,804,267 B1 * | 10/2004 | Long et al. | ................... | 370/524 |
| 6,873,652 B1 * | 3/2005 | Palm | ........................... | 375/222 |
| 7,027,398 B2 * | 4/2006 | Fang | ........................... | 370/235 |
| 7,106,854 B2 * | 9/2006 | Gough et al. | ............... | 379/398 |

FOREIGN PATENT DOCUMENTS

| | | |
|---|---|---|
| WO | 98/54901 | 12/1998 |
| WO | 99/50970 | 10/1999 |
| WO | 99/66683 | 12/1999 |

OTHER PUBLICATIONS

Dixit, "Data Rides High on High-Speed Remote Access", IEEE Communications Magazine, vol. 37, No. 1, Jan. 1999, XP000802114, ISSN 0163-6804.

Kafka, "Goldene Zeiten Fur Das Kupferkabel", Nachrichtentechnik Elektronik, DE, Veb Verlag Technik, Berlin, vol. 48, No. 2, Mar. 1, 1998, XP000752844, ISSN 0323-4657.

* cited by examiner

TERMINATION DEVICE FOR A TELEPHONE LINE

The present invention relates to a termination device for a telephone line of a wire-based telephone system, especially PBX-Systems having multiple telephone lines, wherein at least one telephone line comprises several telephone outlets.

Many locations, for example homes, hotel rooms or offices frequently have multiple telephone outlets or sockets connected to the same telephone line of a telephone network. A high-speed modem, for example a VDSL-Modem, may be connected to one of the outlets in order to provide a high-speed data service. At the same time the other outlets of that telephone line may be connected to additional communication devices such as telephone apparatus, fax machine etc. or may be left unconnected.

FIG. 1 shows a room wall, for example of a hotel room, having telephone sockets A, B, C, D connected via telephone line T to a telephone network. A service splitter is connected to telephone socket A. The service splitter is a coupler that brakes a signal into multiple derived signals. The splitter splits an incoming signal coming from socket A into outgoing signals on basis of the signal frequency. Voice signals which are transmitted in a low frequency range are separated from data signals which are transmitted in a high frequency range. The service splitter is connected to a modem and to a POTS or ISDN-Terminal. In POTS (POTS: plane old telephone system) voice data is transmitted within a low frequency range reaching from 0 Hz to about 3.4 kHz whereas in ISDN the voice data is transmitted within a frequency range reaching from 0 Hz to about 130 kHz. A telephone set is connected to the telephone terminal. The broadband-communication device such as a personal computer or a laptop is connected to the modem for data transmission. The modem shown in FIG. 1 is a high-speed modem for example a VDSL-Modem (VDSL: very high-speed digital subscriber line) which is connected to the service splitter to provide a high-speed data service.

DSL (DSL: digital subscriber line) provides a digital connection for customers or other end users. By using digital signalling methods both voice and data can be transmitted over conventional telephone wires but with a much higher speed than possible with ordinary modems, xDSL-Modems can be ADSL-Modems (ADSL: asymmetric digital subscriber line), HDSL (HDSL: high-bit rate digital subscriber line) MDSL-Modems (MDSL: medium bit rate digital subscriber line) or VDSL-Modems, xDSL-high-speed-modems transmit data in a high frequency range.

FIG. 2 shows in principle a frequency spectrum of signals transmitted via a conventional telephone line, wherein the voice signal is transmitted in a low frequency range and the data signal is transmitted in a high frequency range. The modem sends data from the broadband-communication device via the service splitter and socket A to the telephone network (so called upstream) and receives data from the telephone network via socket A and the service splitter (so called downstream) in a downstream frequency band. The upstream and downstream frequency bands are separated by a guard band, wherein the guard band is preferably within the amateur radio band to avoid disturbances caused by amateur radio.

High-speed-xDSL-Modems receive data within the downstream-frequency band at a frequency which is very high and usually higher than 1 MHz.

There is a functional relation between the propagation speed of the telephone signal V which is proportional to the product of the wavelength $\lambda$ and frequency f:
V~$\lambda$*f The wavelength $\lambda$ of the signals transmitted via the telephone line becomes smaller when the frequency f increases. When the signals are transmitted in a very high frequency band as it is the case with xDSL-Modems the wavelength $\lambda$ will be in the magnitude of several meters, i.e., having a size in the magnitude of walls in a building. Therefore signal reflections will occur at additional sockets to which no devices are connected and which are electrically connected via a wire to a telephone line T such as socket B in FIG. 1. These additional outlets are seen by the high-speed modem as stubs of wire which are connected to the main transmission telephone line T. These stubs reflect the signal in a manner that cause disturbing "notches" in the signal frequency spectrum.

FIG. 2 shows "notches" which are caused by sockets to which no device is connected and which reflect signals. The frequency of the caused "notch" $f_{notch}$ and the severity of the notch are dependent on the length L of the extension wire shown in FIG. 1.

In addition to the signal reflections at socket B further telephone sets which are connected to the other outlets C, D creates when operated additional interference signals to the xDSL transmission in the xDSL data transmission frequency range. For example signals like clock signals from a cordless phone base station connected to socket D may disturb the xDSL data transmission.

Accordingly it is the object of the present invention to provide a termination device which prevents signal disturbances in the data transmission of high-speed modems.

This object is achieved by a termination device having the features of main claim 1.

The termination device according to the present invention comprises
a high-pass filter for separating signals within a frequency band used by a high speed modem, and
impedance means connected to the high-pass filter,
wherein said impedance means has an impedance that matches the impedance of the telephone line in the frequency band used by the high-speed modem.

In a preferred embodiment of the present invention the termination device comprises a low-pass filter for separating telephone voice signals transmitted within a low frequency band.

This provides the advantage that signal disturbances caused by a telephone set or a base station connected to the termination device are suppressed.

In a preferred embodiment of the present invention the impedance of the impedance means is asymptotically resistive in the frequency domain.

In a preferred embodiment the impedance is as resistor.

The impedance is preferably a resistor having 130 Ohms.

In a preferred embodiment of the present invention the low-pass filter and the high-pass filter are passive filters.

In a preferred embodiment the cut-off frequency of the low-pass filter is about 700 kHz.

In a preferred embodiment of the present invention the cut-off frequency of the high-pass filter is about 1 MHz.

In an alternative embodiment the low-pass filter and the high-pass filter of the termination device according to the present invention are active filters.

In a further embodiment of the present invention the low frequency band is a POTS-frequency band reaching from 0 Hz to about 4 kHz.

In an alternative embodiment of the termination device according to the present invention the low frequency band is an ISDN-frequency band reaching from 0 Hz to about 130 kHz.

In a preferred embodiment of the termination device according to the present invention the high-speed modem is an xDSL-modem.

This xDSL-modem is preferably a VDSL-Modem.

In a preferred embodiment of the present invention the frequency band used by the high-speed modem comprises a data downstream frequency band and a data upstream-frequency band.

The data downstream-frequency band reaches preferably from about 0.9 MHz to about 3.5 MHz and the data upstream-frequency band reaches from about 4 MHz to about 7.9 MHz.

The low-pass filter has according to a preferred embodiment an output terminal for connecting a telephone set to the termination device.

In a preferred embodiment of the termination device according to the present invention the low-pass filter and the high-pass filter are connected in parallel to each other.

The telephone line is in a preferred embodiment an unshielded twisted-pair cable (UTP) made of copper.

In a further preferred embodiment of the termination device according to the present invention the termination device is switched automatically to an input terminal connected to the telephone line when no telephone set is connected to the termination device.

In a further embodiment the termination device includes detection means which detects whether a telephone set is connected to the termination device and controls a switching unit to connect the high-pass filter with the telephone line in case that no telephone set in connected.

In a preferred embodiment of the termination device according to the present invention the impedance of the impedance means is adjustable.

In a further embodiment of the termination device according to the present invention the termination device is integrated in a telephone socket.

In an alternative embodiment the termination device is integrated in a telephone set.

In a further alternative embodiment the termination device is integrated in a telephone jack.

In a still further alternative embodiment the termination device is integrated in a telephone extension wire.

Further preferred embodiments of the termination device according to the present invention are described in detail with respect to the figures for explanation of essential features of the invention.

Figure 3:
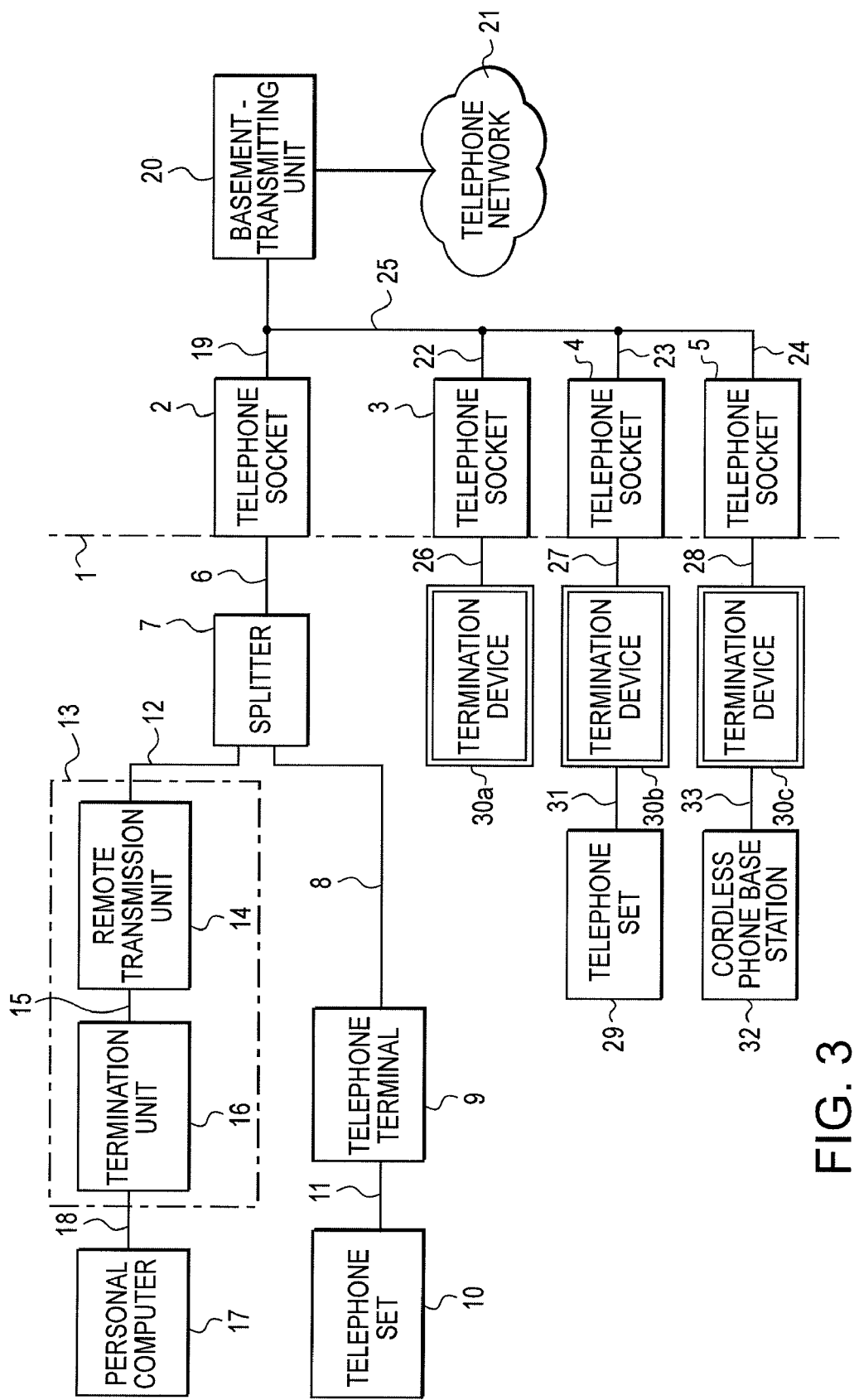
FIG. 3 shows a telephone wiring structure including several termination devices according to the present invention.

As can be seen from FIG. 3 showing a telephone wiring structure there are provided in a room wall 1 several telephone sockets or telephone outlets 2, 3, 4, 5.

Telephone socket 2 is connected via a line 6 to a service splitter 7 for separating telephone voice signals from data signals. The separated telephone voice signals are transmitted bi-directionally via a signal line 8 to a telephone terminal 9 to which the telephone set 10 is connected via a signal line 11.

The data signal separated by the splitter 7 is transmitted via data signal line 12 to a high-speed modem 13 such as an xDSL-modem The xDSL-modem includes an remote transmission unit 14 which is connected via line 15 to a terminal unit 16. A broadband-communication device such as a laptop or a personal computer 17 is connected via a line 18 to the termination unit 16 of the high-speed modem 13.

The socket 2 is connected via telephone wire 19 to a basement-transmitting unit 20 of a telephone network 21. The telephone wire 19 is usually an unshielded twisted-pair cable made of copper.

In the room wall 1 are provided further sockets, 3, 4, 5 which are connected to the telephone wire 19 via connecting wires 22, 23, 24, 25.

FIG. 3 just shows an example for a possible wiring structure within a room wall 1, however the number of sockets and the exact wiring may vary and is unknown. Connected to each of the additional sockets 3, 4, 5 a termination device 30 according to the present invention is connected via connecting lines 26, 27, 28. To termination device 30b according the present invention a conventional telephone set 29 is connected via line 31. Further to termination device 30c according to the present invention a cordless phone base station 32 is connected via line 33. The wiring structure can have any form such as a tree structure.

As can be seen from FIG. 3 a termination device 30 according to the present invention is provided for every telephone socket 3, 4, 5, 6 with the exception of telephone socket 2 connected to the high-speed modem 13 through service splitter 7.

The termination device 30 according to the present invention may be integrated in the telephone sockets 3, 4, 5. In alternative embodiments the termination device 30 according to the present invention is integrated either in the telephone set, in a telephone jack or in a telephone extension wire.

The termination device 30a shown in FIG. 3 prevents disturbing reflections from socket 3 via lines 22, 25 to the telephone wire 19 which might disturb the downstream data transmitted to the high-speed modem 13 in a high frequency band.

The termination device 30b as shown in FIG. 3 prevents signals which are created when the telephone set 29 is operated to cause interference with the xDSL data transmission in the xDSL high frequency range used by the high-speed modem 13.

The termination device 30c can prevent for example clock signals created by the cordless phone base station 32 from disturbing the xDSL data transmission signal within the xDSL high frequency data transmission range.

Figure 1:
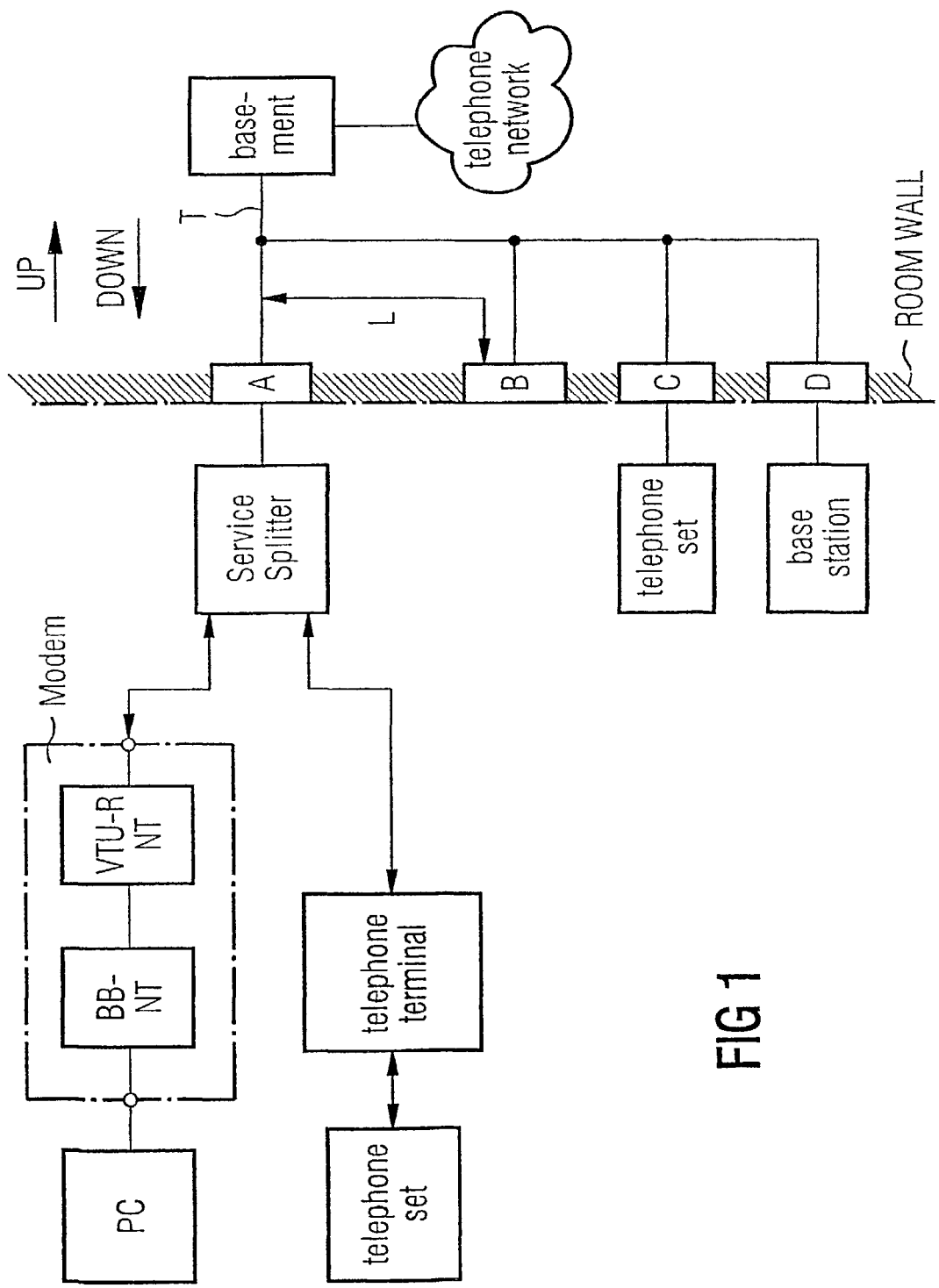
FIG. 1 shows a telephone wiring structure for explanation of the problem underlying the present invention.
Figure 2:
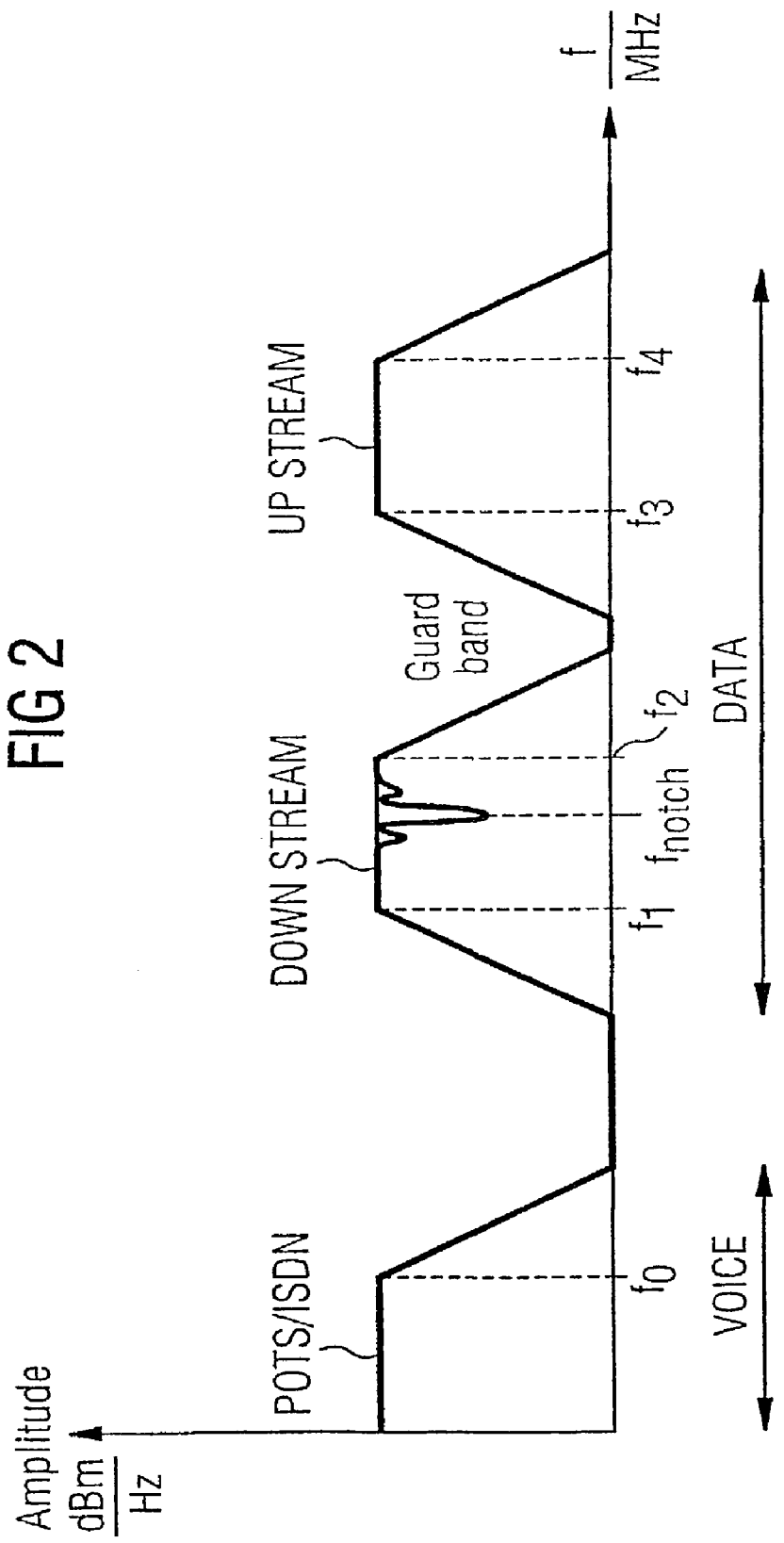
FIG. 2 shows a frequency spectrum for voice and data transmission for explanation of the problem underlying the present invention.

The small termination devices 30 connected to sockets 3 to 5 suppress high frequency wavelike-effects like signal reflections and antenna effects which are disturbing factors effecting signals transmission over the telephone wire 19. Disturbing "notches" as shown in FIG. 2 are prevented by the small termination device 30 according to the present invention thus reducing data errors which might be caused by such "notches". The termination devices 30a to 30c according to the present invention as shown in FIG. 3 can be adapters to be plugged in the sockets 3 to 5 or can be in an alternative embodiment be integrated in the sockets 3 to 5. The high-speed modem 13 shown in FIG. 3 can be any modem using a high frequency band in the telephone wire 19 for data transmission, i.e. any xDSL-modem.

Figure 4:
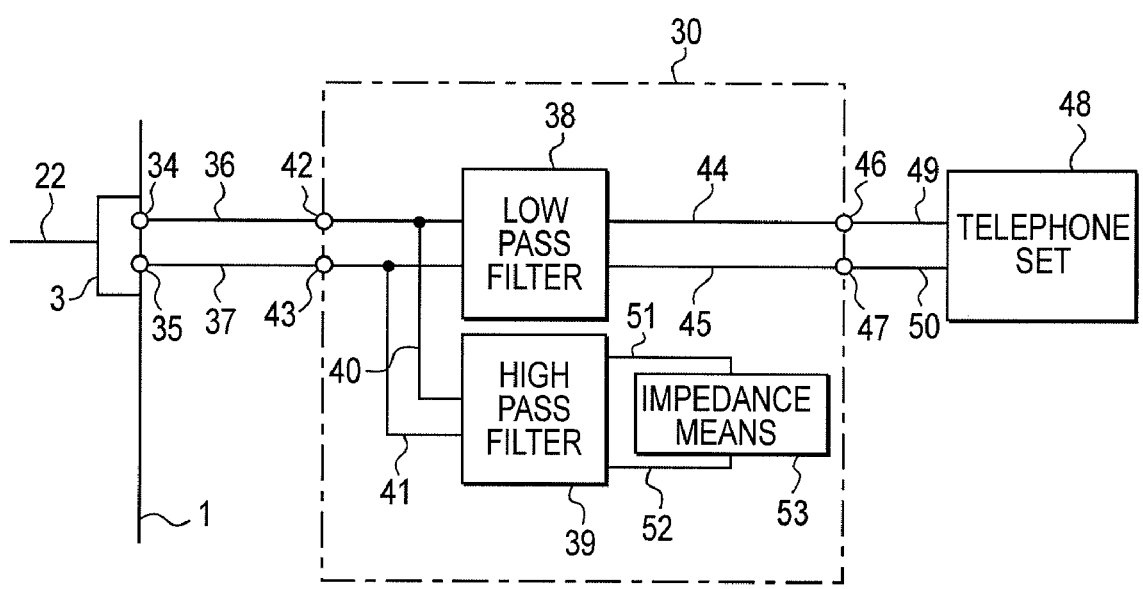
FIG. 4 shows a block diagram of a preferred embodiment of a termination device according to the present invention.

FIG. 4 shows a block diagram of a preferred embodiment of the termination device 30 according to the present invention. The termination device 30 is for example connected to socket 3 shown in FIG. 4. Socket 3 comprises a pair of telephone wires 34, 35 to which the termination device 30 is connected via lines 36, 37. The connecting lines 36, 37 link a low-pass filter 38 to the telephone socket 3. A high-pass filter 39 is connected in parallel to the low-pass filter 38 by means of signal lines 40, 41. The termination device 30 comprise an input terminal 42, 43 to link the termination device 30 to the telephone socket 3 via lines 36, 37. The low-pass filter 38 is further connected via lines 44, 45 to terminals 46, 47 of the termination device 30. A telephone set 48 can be connected the terminals 46, 47 of the termination device 30 via lines 49, 50. The telephone set 48 might be plugged into the termination device but the termination device 30 according to the present invention works also when no telephone set 48 is connected to the low-pass filter 38. The high-pass filter 39 is connected via lines 51, 52 to impedance means 53. Impedance means 53 connected to the high-pass filter 30 comprises an impedance that matches the impedance of the telephone line used by the telephone network system and the frequency band used by the high-speed modem 13.

The impedance of the impedance means 53 is not a complex impedance but a real impedance. The values of the impedance means 53 depend on the impedance of the telephone line of the used telephone system. In Germany the impedance of impedance means 53 is 130 Ohms.

The low-pass filter 38 and the high-pass filter 39 can either be passive or active filters. Passive filters are preferred because the production costs are lower and no power supply for the filters is necessary. The cut-off frequency of the filters are in a preferred embodiment adjustable. The cut-off frequency of the low-pass filter 38 within a preferred embodiment is about 700 kHz and the cut-off frequency of the high-pass filter 39 is about 1 MHz.

The low-pass filter 38 is provided for separating telephone voice signals transmitted bi-directionally to the telephone set 48 within a low frequency band. The low frequency band can be a POTS-frequency band which reaches from 0 Hz to about 4 kHz or in an alternative embodiment can be a ISDN-frequency band reaching from 0 Hz to 130 kHz.

The high pass filter 39 is provided for separating signals occurring on line 22 within a frequency band used by the high-speed modem 13 for data transmission. This high-speed modem 13 can be any xDSL-modem and in particular a VDSL-modem. The high frequency band used by the high-speed modem 13 as shown in FIG. 3 comprises a data downstream frequency band and a data upstream frequency band as shown in FIG. 2. The data downstream frequency band between frequency $f_1$ and frequency $f_2$ ranges in preferred embodiment from about 0.9 MHz to about 3.5 MHz and the data upstream frequency band between frequencies $f_3$, $f_4$ reaches in a preferred embodiment from about 4 MHz to about 7.9 MHz. The cut-off frequencies of the low-pass filter 38 and the high-pass filter 39 are dimensioned depending on the high frequency band ranges used by the high-speed modem 13 for data transmission.

In a preferred embodiment the high-pass filter 39 is switched automatically by means of a switching unit to the telephone socket 3 when no telephone set such as telephone set 48 is connected to the termination device 30. To this end the termination device 30 includes in a preferred embodiment detection means which detects whether the telephone set 48 is connected to the termination device 30, wherein the detection means controls the switching unit to connect the high-pass filter 39 with the telephone socket 3 is case that no telephone set 48 is connected to the termination device 30.

In a further preferred embodiment the impedance of the impedance means 53 is adjustable. This impedance and the cut-off frequencies of the termination device 30 can be adjusted to the requirements of the telephone network within a country such as Germany and the United States.

Figure 5:
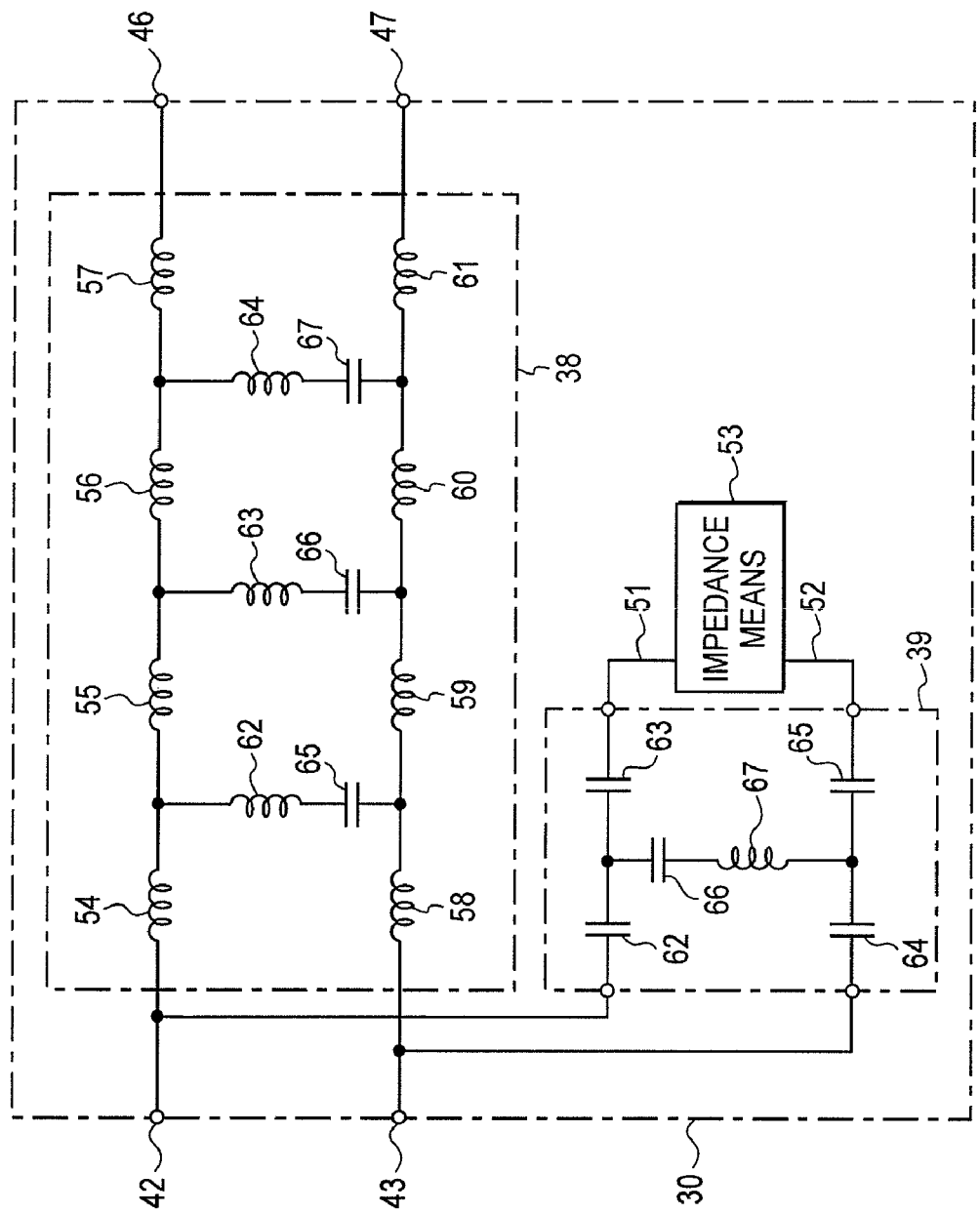
FIG. 5 shows a preferred embodiment of a termination device comprising passive filters according to the present invention.

FIG. 5 shows a preferred embodiment of a termination device 30 according to the present invention having a passive low-pass filter 38 and a passive high-pass filter 39. The low-pass filter 38 and the high-pass filter 39 includes only passive components. The passive components comprise capacitors and inductivities. Both filters 38, 39 do not need any power supply and can be produced at low costs.

Low-pass filter 38 comprises inductivities 54, 55, 56, 57 connected in series between lines 42 and 46. Further, low-pass filter 38 comprises inductivities 58, 59, 60, 61 connected in series between terminal 43 and terminal 47. Further the low-pass filter 38 includes inductivities 62, 63, 64 connected in series to capacitors 65, 66, 67.

The high-pass filter 39 comprises two capacitors 62, 63 connected in series between terminal 42 and line 51. Further high-pass filter 39 includes two 64, 65 also connected in series between terminal 43 and line 52. Furthermore high-pass filter 39 as shown in FIG. 5 has a capacitor 66 connected to an inductivity 67. In a preferred embodiment as shown in FIG. 5 both filters have inductivities and filters with fixed values. In an alternative embodiment the components within the filters 38, 39 are adjustable to vary the cut-off frequency of the filters. As becomes evident from FIG. 5 the termination device 30 according to the present invention includes only passive components and can be therefore produced in a highly integrated manner making the termination device 30 according to the present invention a component which has a very small size. Further the production costs for the termination device 30 as shown in FIG. 5 are very low.

The termination device 30 according to the present invention overcomes disturbing effects in a location with multiple telephone outlets connected to the same telephone line 19 where a high-speed modem 13 especially a VDSL-modem is also connected to that telephone line via an outlet 2. The termination device 30 maintains the functionality and increases the available quality and available maximum transmission distance of the high-speed data transmission service. The available quality is increased by lowering the bit error rate caused by signal notches in the downstream data transmission frequency band or in the upstream data transmission frequency band. Furthermore the termination device 30 according to the present invention can be produced at low costs and small size. This has the additional advantage that the termination device 30 according to the present invention can be integrated into telephone sockets, the telephone jack a within the telephone set itself.

The invention claimed is:

1. A termination device for a telephone line of a wire based telephone system, said termination device comprising:
    a high-pass filter for separating signals within a frequency band used by a high-speed modem for data transmission;
    an impedance connected to the high-pass filter, wherein said impedance includes an impedance value which matches the impedance of the telephone line in the frequency band used by the high-speed modem for data transmission; and
    a low-pass filter having a variable cut-off frequency, wherein the termination device includes first and second line-side terminals for connecting to a telephone line, wherein the high-pass filter is connected across the first and second line-side terminals, and wherein the impedance is connected across the high-pass filter.

2. The termination device according to claim 1, wherein the low-pass filter is configured to separate a telephone voice signal transmitted within a low frequency band.

3. The termination device according to claim 1, wherein the impedance value of said impedance is asymptotically resistive.

4. The termination device according to claim 3, wherein the impedance includes a resistor.

5. The termination device according to claim 2, wherein the low-pass filter and the high-pass filter are passive filters.

6. The termination device according to claim 1, wherein the cut-off frequency of the high-pass filter is about 1 MHz.

7. The termination device according to claim 2, wherein the low-pass filter and the high-pass filter are active filters.

8. The termination device according to claim 2, wherein the low frequency band includes a POTS-frequency band ranging from 0 Hz to about 4 kHz.

9. The termination device according to claim 1, wherein the high-speed modem includes an xDSL-modem.

10. The termination device according to claim 9, wherein the xDSL-modem includes a VDSL-modem.

11. The termination device according to claim 1, wherein the frequency band used by the high-speed modem comprises a data downstream frequency band and a data upstream frequency band.

12. The termination device according to claim 11, wherein the data downstream frequency band ranges from about 0.9 MHz to about 3.5 MHz and the data upstream frequency band ranges from about 4 MHz to about 7.9 MHz.

13. The termination device according to claim 2, wherein the low-pass filter includes an output terminal for connecting a telephone set to the termination device.

14. The termination device according to claim 2, wherein the low-pass filter and the high-pass filter are connected in parallel to each other and to an input terminal of the termination device.

15. The termination device according to claim 1, wherein the telephone line comprises unshielded twisted-pair-cable (UTP).

16. The termination device according to claim 14, wherein the high-pass filter is switched automatically to the input terminal when no telephone set is connected to the termination device.

17. The termination device according to claim 14, wherein the termination device includes a detector configured to detect whether a telephone set is connected to the termination device and being further configured to control a switching unit to connect the high-pass filter to the input terminal in case that no telephone set is connected to the termination device.

18. The termination device according to claim 1, wherein the impedance value of said impedance is adjustable.

19. The termination device according to claim 1, wherein the termination device is configured to be integrated in a telephone socket.

20. The termination device according to claim 1, wherein the device is configured to be integrated in a telephone set.

21. The termination device according to claim 1, wherein the termination device is configured to be integrated in a telephone jack.

22. The termination device according to claim 1, wherein the telephone device is configured to be integrated in a telephone extension wire.

23. The termination device according to claim 2, wherein the cut-off frequency of the low-pass filter and a cut-off frequency of the high-pass filter are adjustable.

24. The termination device of claim 1, wherein the cut-off frequency of the low pass filter is dimensioned depending on a high frequency band range used by the high speed modem for data transmission.

25. A termination device for a telephone line of a wire based telephone system, said termination device comprising:
a high-pass filter for separating signals within a frequency band used by a high-speed modem for data transmission;
an impedance connected to the high-pass filter, wherein said impedance includes an impedance value which matches the impedance of the telephone line in the frequency band used by the high-speed modem for data transmission; and
a low-pass filter having a variable cut-off frequency, wherein the impedance value of said impedance is asymptotically resistive, wherein the impedance includes a resistor, and wherein the impedance value of the resistor is 130 Ohms.

26. A termination device for a telephone line of a wire based telephone system, said termination device comprising:
a high-pass filter for separating signals within a frequency band used by a high-speed modem for data transmission;
an impedance connected to the high-pass filter, wherein said impedance includes an impedance value which matches the impedance of the telephone line in the frequency band used by the high-speed modem for data transmission; and
a low-pass filter having a variable cut-off frequency, wherein the low-pass filter is configured to separate a telephone voice signal transmitted within a low frequency band, and wherein the cut-off frequency of the low-pass filter is about 700 kHz.

27. A termination device for a telephone line of a wire based telephone system, said termination device comprising:
a high-pass filter for separating signals within a frequency band used by a high-speed modem for data transmission;
an impedance connected to the high-pass filter, wherein said impedance includes an impedance value which matches the impedance of the telephone line in the frequency band used by the high-speed modem for data transmission; and
a low-pass filter having a variable cut-off frequency, wherein the low-pass filter is configured to separate a telephone voice signal transmitted within a low frequency band, and wherein the frequency band includes an ISDN-frequency band ranging from 9 Hz to 130 kHz.

28. A termination device for a telephone line of a wire based telephone system, said termination device comprising:
a high-pass filter for separating signals within a frequency band used by a high-speed modem for data transmission;
an impedance connected to the high-pass filter, wherein said impedance includes an impedance value matches the impedance of the telephone line in the frequency band used by the high-speed modem for data transmission; and
a low-pass filter including an ISDN-frequency band ranging from approximately 9 Hz to approximately 130 kHz, wherein the termination device includes first and second line-side terminals for connecting to a telephone line, wherein the high-pass filter is connected across the first and second line-side terminals, and wherein the impedance is connected across the high-pass filter.

29. The termination device of claim 28, wherein the cut-off frequency of the low-pass filter is dimensioned depending on a high frequency band range used by the high-speed modem for data transmission.

30. A termination device for a telephone line of a wire based telephone system, said termination device comprising:
a high-pass filter for separating signals within a first frequency band used by a high-speed modem for data transmission;

an impedance connected to the high-pass filter, wherein said impedance includes an impedance value which matches the impedance of the telephone line in the first frequency band used by the high-speed modem for data transmission; and a low-pass filter for separating signals within a second frequency band, wherein a cut-off frequency of the low-pass filter and a cut-off frequency of the high-pass filter are adjustable, wherein the termination device includes first and second line-side terminals for connecting to a telephone line, wherein the high-pass filter is connected across the first and second line-side terminals, and wherein the impedance is connected across the high-pass filter.

31. The termination device of claim 30 wherein the cut-off frequency of the low-pass filter is dimensioned depending on a high frequency band range used by the high-speed modem for data transmission.

32. A termination device for a telephone line of a wire based telephone system, said termination device comprising:

a high-pass filter for separating signals within a frequency band used by a high-speed modem for data transmission;

an impedance connected to the high-pass filter, wherein said impedance includes an impedance value which matches the impedance of the telephone line in the frequency band used by the high-speed modem for data transmission; and a low-pass filter having a variable cut-off frequency, wherein the termination device includes device-side terminals and line-side terminals, wherein the low-pass filter includes a plurality of inductors connected in series between the device-side terminals and the line-side terminals and inductors and capacitors connected across the device-side terminals and the line-side terminals, and wherein the high-pass filter includes a plurality of capacitors and an inductor connected across the device-side terminals and the line-side terminals.

33. A termination device for a telephone line of a wire based telephone system, said termination device comprising:

a high-pass filter for separating signals within a frequency band used by a high-speed modem for data transmission;

an impedance connected to the high-pass filter, wherein said impedance includes an impedance value matches the impedance of the telephone line in the frequency band used by the high-speed modem for data transmission; and a low-pass filter including an ISDN-frequency band ranging from approximately 9 Hz to approximately 130 kHz, wherein the termination device includes device-side terminals and line-side terminals, wherein the low-pass filter includes a plurality of inductors connected in series between the device-side terminals and the line-side terminals and inductors and capacitors connected across the device-side terminals and the line-side terminals, and wherein the high-pass filter includes a plurality of capacitors and an inductor connected across the device-side terminals and the line-side terminals.

34. A termination device for a telephone line of a wire based telephone system, said termination device comprising:

a high-pass filter for separating signals within a first frequency band used by a high-speed modem for data transmission;

an impedance connected to the high-pass filter, wherein said impedance includes an impedance value which matches the impedance of the telephone line in the first frequency band used by the high-speed modem for data transmission; and a low-pass filter for separating signals within a second frequency band, wherein a cut-off frequency of the low-pass filter and a cut-off frequency of the high-pass filter are adjustable, wherein the termination device includes device-side terminals and line-side terminals, wherein the low-pass filter includes a plurality of inductors connected in series between the device-side terminals and the line-side terminals and inductors and capacitors connected across the device-side terminals and the line-side terminals, and wherein the high-pass filter includes a plurality of capacitors and an inductor connected across the device-side terminals and the line-side terminals.

* * * * *